(12) United States Patent
Haug

(10) Patent No.: US 12,492,011 B2
(45) Date of Patent: Dec. 9, 2025

(54) REMOTE-CONTROLLABLE LIFTING AND/OR TRANSPORTING ARRANGEMENT

(71) Applicant: Thomas Haug, Birkenfeld (DE)

(72) Inventor: Thomas Haug, Birkenfeld (DE)

( * ) Notice: Subject to any disclaimer, the term of this patent is extended or adjusted under 35 U.S.C. 154(b) by 65 days.

(21) Appl. No.: 18/027,204

(22) PCT Filed: Jul. 5, 2022

(86) PCT No.: PCT/EP2022/068518
§ 371 (c)(1),
(2) Date: Mar. 20, 2023

(87) PCT Pub. No.: WO2023/285200
PCT Pub. Date: Jan. 19, 2023

(65) Prior Publication Data
US 2023/0373656 A1 Nov. 23, 2023

(30) Foreign Application Priority Data
Jul. 13, 2021 (DE) ...................... 10 2021 118 081.3

(51) Int. Cl.
*B64F 1/22* (2024.01)
*B64F 1/228* (2024.01)
*G05D 1/00* (2006.01)

(52) U.S. Cl.
CPC .......... *B64F 1/228* (2013.01); *G05D 1/0033* (2013.01); *G05D 1/0055* (2013.01)

(58) Field of Classification Search
CPC . B64F 1/227; B64F 1/228; B60P 3/11; G05D 1/0033; G05D 1/0055
See application file for complete search history.

(56) References Cited

U.S. PATENT DOCUMENTS 3,937,290 A 2/1976 Benning
5,746,261 A * 5/1998 Bowling ............... A01G 23/067
144/334

(Continued)

FOREIGN PATENT DOCUMENTS

DE 41 21 793 A1 1/1993
DE 10 2008 028 434 A1 12/2009
(Continued)

OTHER PUBLICATIONS

EP 3756946 English Translation; INV: Becci et al.; Pub. Date: Dec. 2009 (Year: 2009).*

(Continued)

*Primary Examiner* — Joseph C Rodriguez
(74) *Attorney, Agent, or Firm* — Birch, Stewart, Kolasch & Birch, LLP

(57) ABSTRACT

A lifting and/or transporting arrangement includes a remote-controllable lifting and/or transporting device, such as an aircraft pusher; a remote-control transmitter for controlling a lifting and/or transporting movement of the lifting and/or transporting device; and a safety apparatus on which data for defining a horizontally extending virtual enablement area are stored and which has a sensor system for determining a position of the remote-control sensor. A control process of the remote-control transmitter can be enabled or blocked by the safety apparatus on the basis of a currently detected position of the remote-control transmitter with respect to the enablement area. The enablement area has a limited vertical extent in a vertical direction, and the sensor system of the safety apparatus has height determination device for determining a height of the remote-control transmitter. The control process can be enabled or blocked on the basis of a currently detected height of the remote-control transmitter with respect to the vertical extent of the enablement area.

20 Claims, 4 Drawing Sheets

(56) References Cited

U.S. PATENT DOCUMENTS

Figure 1:
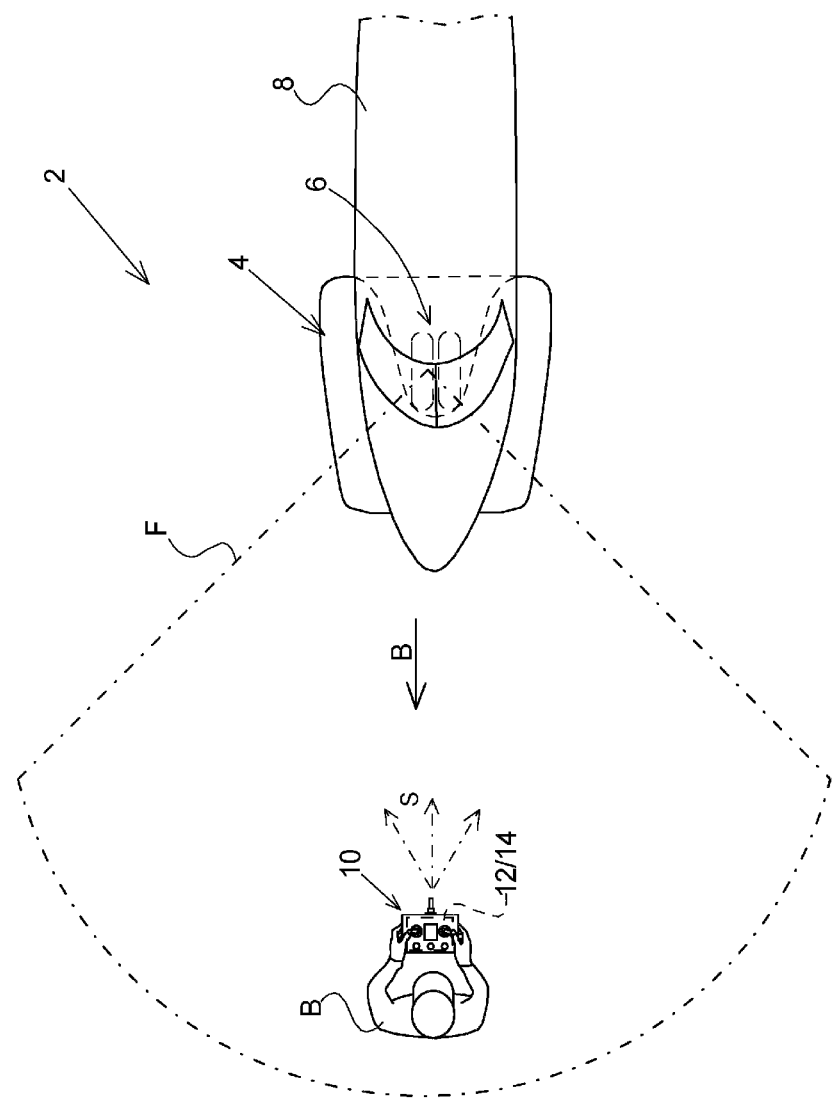

| | | | | |
|---|---|---|---|---|
| 6,305,484 | B1 | 10/2001 | Leblanc | |
| 8,970,363 | B2* | 3/2015 | Kraimer | G05D 1/0033 |
| | | | | 180/315 |
| 10,047,500 | B2* | 8/2018 | Geier | E01C 19/262 |
| 11,132,894 | B2* | 9/2021 | Weger | G01S 11/06 |
| 11,649,146 | B2* | 5/2023 | Andersson | B66C 13/46 |
| | | | | 701/2 |
| 12,260,767 | B2* | 3/2025 | Muralidharan | G08G 5/51 |
| 2006/0271263 | A1* | 11/2006 | Self | G05B 19/409 |
| | | | | 701/2 |
| 2015/0161872 | A1* | 6/2015 | Beaulieu | B66C 13/40 |
| | | | | 340/686.6 |
| 2017/0057663 | A1 | 3/2017 | Alonso Tabares et al. | |
| 2019/0155278 | A1* | 5/2019 | Idbrant | G01S 13/765 |
| 2023/0150805 | A1* | 5/2023 | de Jong | B66F 17/006 |
| | | | | 254/89 R |

FOREIGN PATENT DOCUMENTS

| | | |
|---|---|---|
| DE | 10 2017 118 890 A1 | 2/2019 |
| DE | 10 2019 117 454 A1 | 12/2020 |
| EP | 2 272 760 A1 | 1/2011 |
| EP | 3 444 790 A1 | 2/2019 |
| EP | 3 756 946 A1 | 12/2020 |

OTHER PUBLICATIONS

International Search Report (PCT/ISA/210), issued in PCT/EP2022/068518, dated Nov. 2, 2022.

\* cited by examiner

REMOTE-CONTROLLABLE LIFTING AND/OR TRANSPORTING ARRANGEMENT

The invention concerns a lifting and/or transporting arrangement with a remote-controllable lifting and/or transporting device, such as in particular an aircraft pusher, as well as a method for operating such a lifting/transporting arrangement. The latter has a remote-control transmitter for controlling a lifting and/or transporting movement of the lifting and/or transporting apparatus and a safety apparatus on which data for defining a horizontally extending virtual enablement area are stored and which has a sensor system for determining a position of the remote-control sensor. By means of the safety apparatus, a control process of the remote-control transmitter can be carried out or disabled or blocked depending on a currently detected position of the remote-control transmitter relative to the enablement area.

EP3756946A1 describes a method for increasing the operational safety of a tail lift for a vehicle. It is provided that the control of the tail lift by a remote-control transmitter is only enabled when the transmitter is located in an area which ensures sufficient visibility of the tail lift for safe operation. The position of the remote-control transmitter is detected at a determined height.

Beyond the safety functions of this safety apparatus known from the prior art, there is a need in certain lifting and/or transporting arrangements to safeguard further operating situations that cannot be detected by the known safety apparatus. For example, in an aircraft pusher, applications must be avoided that are not covered by insurance. Such an inadmissible application occurs, for example, when a person operating the aircraft pusher is sitting in the cockpit of the aircraft to be relocated.

The objective of the invention is to avoid the mentioned disadvantages in a generic lifting and/or transporting arrangement and to ensure safe operation in a wider range of lifting and/or transporting arrangements or, depending on the type of the respective lifting and/or transporting arrangement, to effectively block an unsafe or impermissible mode of operation.

This objective is achieved by a lifting and/or transporting arrangement. The enablement area also has a limited vertical extent in a vertical direction. In addition, height determination means are provided on the sensor system of the safety apparatus for determining a current height position of the remote-control transmitter. In this case, the control process can additionally be enabled or disabled for performance in dependence on a currently determined height position of the remote-control transmitter with respect to the vertical extent of the enablement area. This can also ensure safe operation of lifting and/or transporting devices in which the safety depends on a vertical position of the remote-control transmitter or its user in relation to the vertical position of the lifting and/or transporting device. For example, this can prevent an aircraft pusher from being controlled from an unsuitable or inadmissible position, such as in particular from the cockpit of a corresponding aircraft.

Preferably, the vertical extent of the enablement area is thereby determined as a height difference area with respect to the lifting and/or transporting device, while the height position is determined in the form of a height difference of the remote-control transmitter with respect to the lifting and/or transporting device. In this way, the enablement area can be precisely limited in the vertical direction. In addition, it is relatively easy to determine in this way whether the remote-control transmitter is inside or outside the vertical extent of the enablement area.

Advantageously, the enablement area has a maximum height of 2 m above a ground on which the lifting and/or transporting device is standing or being moved. In this way, unauthorised control from a cockpit of the aircraft to be relocated can generally be disabled, especially in the case of aircraft pushers.

Advantageously, transmitting means of the remote-control transmitter are provided which can be stopped or blocked by means of the safety apparatus to disable the control process. In this way, a transmission of control signals by which the respective lifting and/or transporting device could be operated in an impermissible manner can be reliably avoided.

Alternatively, the remote-controllable lifting and/or transporting device can be fixed in a rest position to disable the control process by transmitting a zero signal of a travel channel on the part of the remote-control transmitter. In this way, the lifting and/or transporting device can also be actively held in a rest position when the remote-control transmitter is outside the enablement area in order to disable unauthorised operation.

Advantageously, the respective current height position of the remote-control transmitter is determined by the height determination means, in particular in a continuously recurring manner. By means of such an online determination of the height position or the height difference during the operation of a lifting and/or transporting arrangement, changes in the relative height position of the remote-control transmitter with respect to the lifting and/or transporting device can be detected promptly in order to permit or disable the operation in dependence on the height position of the remote-control transmitter with respect to the vertical extent of the enablement area. The height determination means can be provided only on the lifting and/or transporting device or on the remote-control transmitter, or alternatively on both units, depending on the mode of operation.

In this case, it is advantageous when the height determination means have a first height measurement device on the lifting and/or transporting device and a second height measurement device on the remote-control transmitter in order to be able to determine the respective current height difference or the position of the remote-control transmitter with respect to the enablement area by corresponding information transmission between both devices. The height measuring devices can comprise all known and suitable means for height determination, such as GPS or GNSS receivers or a barometric, gravimetric or trigonometric sensor system.

Furthermore, the above-mentioned objective is achieved by a method for operating a lifting/transporting arrangement in one of the embodiments mentioned above, in which, in a first step, the enablement area is defined in advance and stored in the safety apparatus in terms of data. In a second step, a current position of the remote-control transmitter is detected and compared with the stored enablement area. In a third step, the control process is then enabled in accordance with the control instruction entered at the remote-control transmitter in dependence on whether the remote-control transmitter is currently in the enablement area. It is provided that in the first step the enablement area is also limited in the vertical direction and in the second step a current height position of the remote-control transmitter is determined and compared with the vertical extent of the enablement area. In this way, the operation of lifting and/or transporting devices can be enabled or blocked or stopped, in particular in dependence on a suitable vertical position of the remote-control transmitter or its user in relation to the vertical position of the lifting and/or transporting device. For example, this can prevent an aircraft pusher from being controlled from an unsuitable position, such as in particular from the cockpit of an aircraft to be relocated.

Advantageously, in the second step, the height position of the remote-control transmitter is determined in the form of its height difference relative to the lifting and/or transporting device and compared with the height difference area of the enablement area. In this way, it can be reliably and simply determined whether the remote-control transmitter is within the enablement area in the vertical direction and thus a control process of the remote-control transmitter can be performed.

Advantageously, the height difference is determined in the second step both at the remote-control transmitter and at the lifting/transporting device by means of GPS or GNSS signal, barometrically, gravimetrically and/or trigonometrically. The means required for this, such as GPS receivers, pressure or optical sensors, are available in commercially available designs, whereby the required measuring devices for determining the position, in particular the height, of the remote-control transmitter in relation to the specified enablement area can be provided at low cost.

In addition, it is favourable when, in the third step, the transmitting means emit active control signals by means of which the lifting and/or transporting device is held in a rest position when the detected current position of the remote-control transmitter lies outside the enablement area. In this way, an impermissible operation of the lifting/transporting device, in particular by transmission of a zero signal of a travel channel on the part of the remote-control transmitter, can be actively disabled and the lifting/transporting device can be actively fixed in a rest position.

It is pointed out that all the above-described features of the object according to the invention can be interchanged or combined with one another, provided that an interchange or combination thereof is not precluded for technical reasons.

Figure 2:
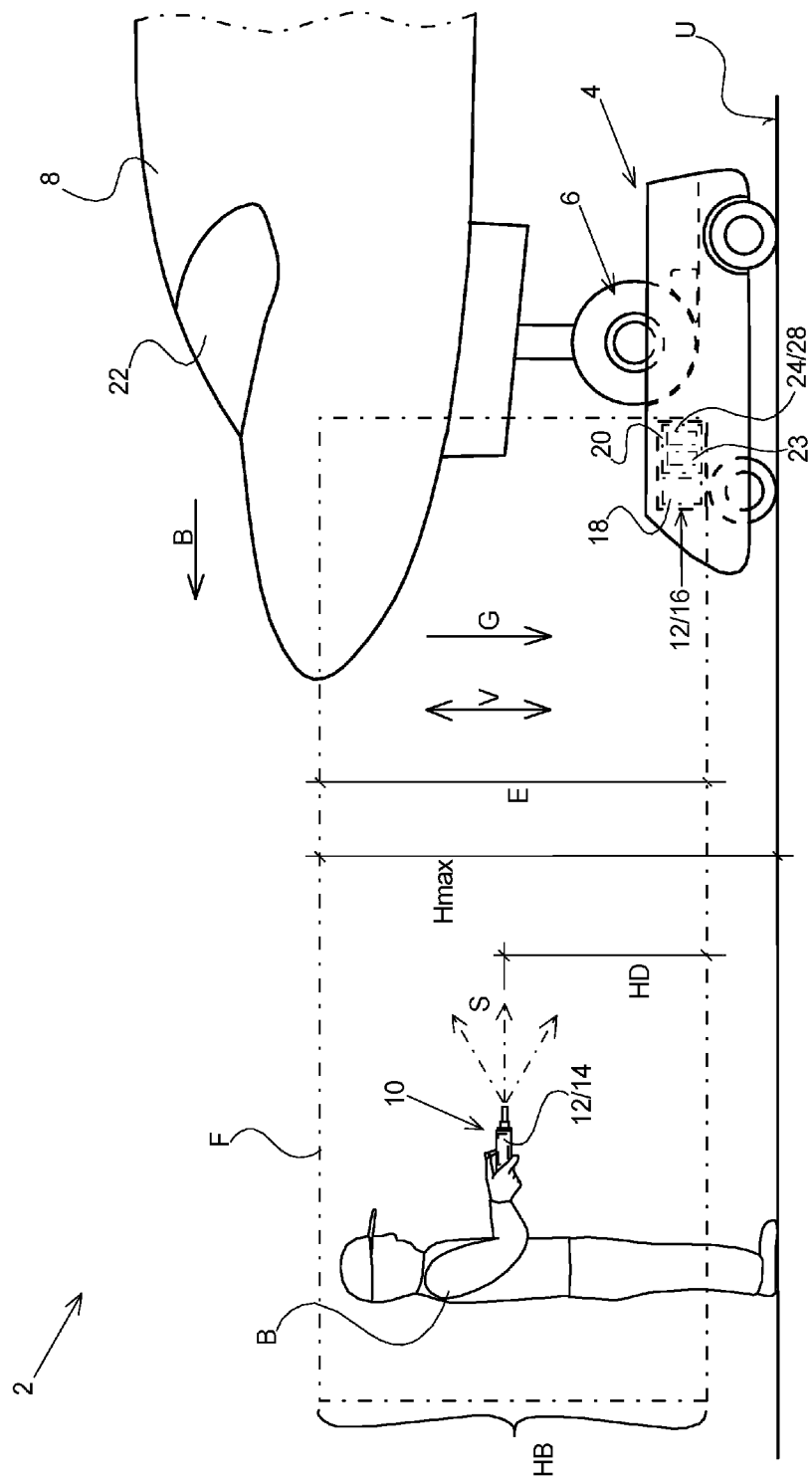
Figure 3:
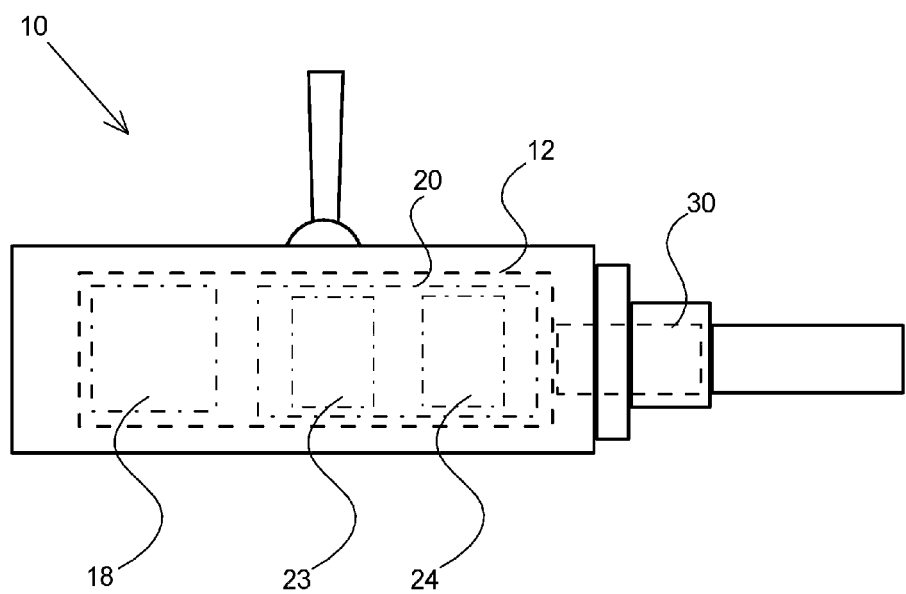
Figure 4:
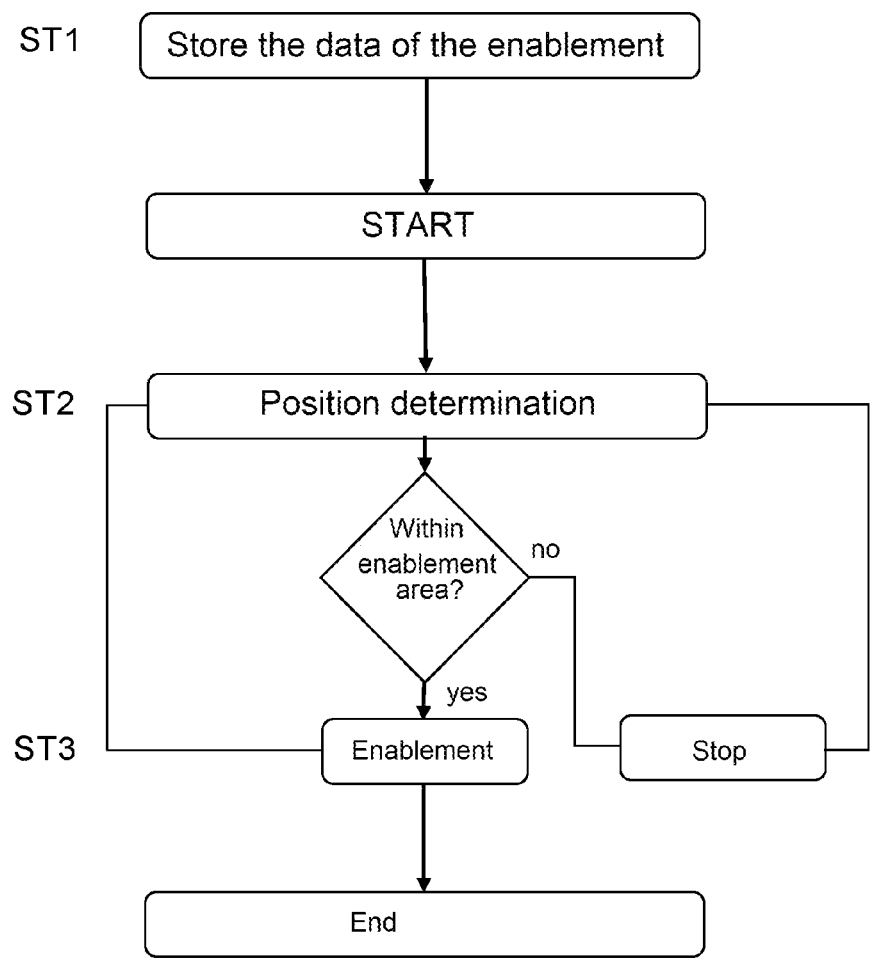

An exemplary embodiment of the invention is shown in the figures. They show:

FIG. 1 a top view of a lifting and/or transporting arrangement according to the invention, FIG. 2 a side view of the lifting and/or transporting arrangement according to FIG. 1, FIG. 3 a magnified view of a remote-control transmitter of the lifting and/or transporting arrangement according to FIG. 2 and FIG. 4 a flow chart of a method for operating the lifting and/or transporting arrangement according to FIG. 1.

FIGS. 1 and 2 show a lifting and/or transporting arrangement 2 with a lifting and/or transporting device 4 in the exemplary form of an aircraft pusher to which a nose gear 6 of an aircraft 8 can be attached in order to be able to move the aircraft 8 independently of its own propulsion, such as to or from a parking place, in particular in a hangar.

For controlling a lifting and/or transporting movement of the lifting and/or transporting device 4, a remote-control transmitter 10, in particular a portable remote-control transmitter, is thereby provided, which can be held and operated manually by a user B.

In order to ensure that the user B of the remote-control transmitter 10 is located during a control process at a location from which they can view the surroundings of the lifting and/or transporting apparatus 4 or of the aircraft 8 relevant to the respective lifting and/or transporting movement without obstruction, the lifting and/or transporting arrangement 2 has a safety apparatus 12. In the embodiment shown, this is partially implemented on transmitter electronics 14 of the remote-control transmitter 10 and partially on device electronics 16 of the lifting and/or transporting device 4. Alternatively, the safety apparatus 12 can also be provided only on the remote-control transmitter 10 or only on the lifting and/or transporting device 4.

In any case, as can be seen from FIG. 3, the safety apparatus 12 comprises at least data processing means 18 for storing and processing a data record for defining a virtual enablement area F as well as a sensor system 20 for determining a current position of the remote-control transmitter 10 with respect to the virtual enablement area F. In this case, the enablement area F with respect to the lifting and/or transporting device 4 can be fixed or, for example, can be adapted or changed in dependence on a respective current control command.

In any case, the enablement area F has a horizontally limited extent as shown in FIG. 1, which is adapted, for example, in the form of a circle or, as shown, in the form of a segment of a circle and extends, in particular, in a currently controlled direction of movement B away from the lifting and/or transporting device 4.

As can be seen from FIG. 2, the enablement area F also has a limited vertical extent E in a vertical direction V, in particular parallel to the direction of gravity G. The limited vertical extent E is formed by a height difference area HB in relation to the lifting and/or transporting device 4, which has a maximum height Hmax of 2 m in relation to the ground U at the top. As a result, the enablement area F extends at least below a visual area of a cockpit 22 of the aircraft 8.

The sensor system 20 of the safety apparatus 12 comprises, in addition to position determination means 23, which serve to determine a current horizontal position of the remote-control transmitter 10, also height determination means 24. By means of these height determination means 24, a respective current height position H of the remote-control transmitter 10 or a height difference HD of the remote-control transmitter 12 relative to the lifting and/or transporting device 4 or the ground U can be determined recurrently. The height determination means 24 can comprise, for example, a first height measuring device 26 of the remote-control transmitter 10 (according to FIG. 3) and a second height measuring device 28 of the lifting and/or transporting device 4 (according to FIG. 2), which are formed by known and suitable measuring devices, such as, for example, GPS or GNSS receivers or a sensor system operating barometrically, gravimetrically or trigonometrically.

By means of the position determining means 23 of the safety apparatus 12, the relative horizontal position of the remote control apparatus 10 with respect to the lifting and/or transporting apparatus 4 can thus be determined. In addition to this, the height determination means 24 of the safety apparatus 12 can continuously check whether the height position of the remote-control transmitter 10 is within the predetermined height difference area HB and whether the remote-control transmitter as a whole is within the enablement area F.

In dependence on these recurring position determinations of the remote-control transmitter 10 relative to the virtual enablement area F, the safety apparatus 12 either enables the control process or blocks it or stops a previously enabled control process.

For blocking or stopping the control process, transmitting means 30 of the remote-control transmitter 10 (according to FIG. 3) can be stopped or switched off. Alternatively, the control process can also be stopped by the safety apparatus 12 initiating the transmission of a zero signal on a travel channel of the remote-control transmitter 10, whereby the lifting and/or transporting device 4 can be actively fixed in a rest position.

The method for operating the lifting and/or transporting arrangement 2 is as follows, as shown in FIG. 4:

Before the actual operation of the lifting and/or transporting arrangement 2, in a first step, the data for defining the release area F is stored at the safety apparatus 12. The data can be stored by the manufacturer or later by the user B. The user B can preferably be provided with different data sets, for example for different applications or for different objects or loads that are to be moved with the lifting/transporting device 4. In the case of a lifting/transporting device 4 in the form of an aircraft pusher, for example, different data sets can be made available, each adapted to a specific aircraft type and its dimensions. For example, the data sets can be downloaded by the user B via the internet or a correspondingly provided online platform.

In any case, in this first step ST1, the enablement area F is limited both with regard to its horizontal extent, such as in dependence on its currently controlled direction of movement B, and with regard to its vertical extent E.

After a start of the lifting/transporting arrangement 2, such as in particular by activating the lifting/transporting device 4 as well as the remote-control transmitter 10, the respective current position of the remote-control transmitter 10 is then detected recurrently in a second step ST2 and matched with the enablement area F specified by the stored data record. In addition to determining the horizontal position of the lifting/transporting device 4, the height difference HD between the remote-control transmitter 10 and the lifting/transporting device 4 is also determined, for example barometrically, by means of the two height measuring devices 26, 28, and the current height position H of the remote-control transmitter 10 relative to the lifting/transporting device 4 is determined from this. The determined height position H or the height difference HD can then be matched with the vertical extent E or the height difference area HB in order to determine whether the remote-control transmitter 10 is also arranged in the vertical direction V within the enablement area F.

If it is determined during this matching that the remote-control transmitter 10 is currently arranged within the enablement area F, then in a third step ST3 the transmission of control signals S from the remote-control transmitter 10 to the lifting/transporting device 4 is enabled for the execution of a control process in accordance with a control instruction entered at the remote-control transmitter 10.

If, on the other hand, it is determined during the matching that the remote-control transmitter 10 is not currently arranged within the enablement area, the transmission of control signals S from the remote-control transmitter 10 to the lifting/transporting device 4 is disabled or stopped in the third step. This is done, for example, by the transmitting means 30 of the remote-control transmitter 10 remaining deactivated or blocked, or by active control signals being transmitted via the transmitting means 30, in particular in the form of zero instructions of a travel channel, by which the lifting/transporting device 10 is actively held in a rest position.

This matching of the current position of the remote-control transmitter 10 with the subsequent enablement or disablement of the control process according to steps ST2 and ST3 is performed continuously and recurrently until the operation of the lifting/transporting arrangement 2 is terminated by switching off the remote-control transmitter 10 and/or the lifting/transporting device 2.

It should be noted that all the elements and features of the various embodiments of the object according to the invention described above are interchangeable or combinable with one another, provided that an exchange or combination thereof is not precluded for technical reasons.

The invention claimed is:

1. A lifting and/or transporting arrangement, comprising:
   a remote-controllable lifting and/or transporting apparatus;
   a remote-control transmitter for controlling a lifting and/or transporting movement of the lifting and/or transporting apparatus; and
   a safety apparatus, at which data for defining a horizontally extending virtual enablement area are stored and which has a sensor system for detecting a position of the remote-control transmitter,
   wherein by means of the safety apparatus, a control process of the remote-control transmitter can be enabled or disabled in dependence on a currently detected position of the remote-control transmitter relative to the enablement area,
   wherein the enablement area has a limited vertical extent in a vertical direction and the sensor system of the safety apparatus has height determination means for determining a height position of the remote-control transmitter,
   wherein the control process can be enabled or disabled in dependence on a currently determined height position of the remote-control transmitter relative to the vertical extent of the enablement area, the currently determined height position of the remote-control transmitter being determined continuously, and
   wherein the limited vertical extent is defined as a height difference range relative to the lifting and/or transporting apparatus, and the height position of the remote-control transmitter is determined as a height difference of the remote-control transmitter relative to the lifting and/or transporting apparatus.

2. The lifting/transporting arrangement according to claim 1, wherein the vertical extent of the enablement area is formed by a height difference area relative to the lifting and/or transporting device.

3. The lifting/transporting arrangement according to claim 1, wherein the enablement area has a maximum height of 2 m relative to a ground.

4. The lifting/transporting arrangement according to claim 1, wherein transmitting means of the remote-control transmitter can be blocked/stopped by means of the safety apparatus in order to disable the control process.

5. The lifting/transporting arrangement according to claim 1, wherein, in order to disable the control process, the remote-controllable lifting and/or transporting device can be actively fixed in a rest position by transmission of a zero signal by the remote-control transmitter.

6. The lifting/transporting arrangement according to claim 1, wherein the height determination means determine the respective current height position of the remote-control transmitter relative to the lifting and/or transporting device in a recurring manner.

7. The lifting/transporting arrangement according to claim 6, wherein the height determination means have a first height measuring device on the lifting and/or transporting device and a second height measuring device on the remote-control transmitter.

8. A method of operating the lifting/transporting arrangement according to claim 1, in which, in a first step, the enablement area is defined in advance and stored in the safety apparatus in terms of data;

in a second step, a current position of the remote-control transmitter is detected and compared with the stored enablement area; and in a third step, the control process is enabled in accordance with a control instruction input at the remote-control transmitter in dependence thereon, whether the remote-control transmitter is currently located in the enablement area, wherein, in the first step, the enablement area is limited in the vertical direction, and, in the second step, a current altitude of the remote-control transmitter is determined and compared with the vertical extent of the enablement area.

9. The operating method according to claim 8, wherein in the second step, the height position of the remote-control transmitter is determined in the form of its height difference with respect to the lifting and/or transporting device and is compared with the height difference area of the enablement area.

10. The operating method according to claim 8, wherein the height difference is determined in the second step by means of a GPS or GNSS signal, barometrically, gravimetrically and/or trigonometrically.

11. The operating method according to claim 1, wherein in the third step the transmitting means are blocked when the detected current position of the remote-control transmitter is outside the enablement area.

12. The operating method according to claim 1, wherein in the third step the transmitting means transmit active control signals by means of which the lifting and/or transporting device is held in a rest position when the detected current position of the remote-control transmitter lies outside the enablement area.

13. The lifting/transporting arrangement according to claim 1, wherein the remote-controllable lifting and/or transporting apparatus is an aircraft pusher.

14. The lifting/transporting arrangement according to claim 2, wherein the enablement area has a maximum height of 2 m relative to a ground.

15. The lifting/transporting arrangement according to claim 2, wherein transmitting means of the remote-control transmitter can be blocked/stopped by means of the safety apparatus in order to disable the control process.

16. The lifting/transporting arrangement according to claim 3, wherein transmitting means of the remote-control transmitter can be blocked/stopped by means of the safety apparatus in order to disable the control process.

17. The lifting/transporting arrangement according to claim 2, wherein, in order to disable the control process, the remote-controllable lifting and/or transporting device can be actively fixed in a rest position by transmission of a zero signal by the remote-control transmitter.

18. The lifting/transporting arrangement according to claim 3, wherein, in order to disable the control process, the remote-controllable lifting and/or transporting device can be actively fixed in a rest position by transmission of a zero signal by the remote-control transmitter.

19. The lifting/transporting arrangement according to claim 2, wherein the height determination means determine the respective current height position of the remote-control transmitter relative to the lifting and/or transporting device in a recurring manner.

20. The lifting/transporting arrangement according to claim 3, wherein the height determination means determine the respective current height position of the remote-control transmitter relative to the lifting and/or transporting device in a recurring manner.

* * * * *